United States Patent
Agah

(10) Patent No.: US 6,370,187 B1
(45) Date of Patent: Apr. 9, 2002

(54) ADAPTIVE POWER DISSIPATION FOR DATA COMMUNICATIONS SYSTEM

(75) Inventor: Michael D. Agah, Sunnyvale, CA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/053,192

(22) Filed: Apr. 1, 1998

(51) Int. Cl.[7] .................................................. H04L 5/16
(52) U.S. Cl. ........................ 375/219; 375/285; 375/297; 375/345
(58) Field of Search ................................ 375/219, 220, 375/222, 223, 297, 285, 318, 345; 455/127; 330/149, 129, 275, 285

(56) References Cited

U.S. PATENT DOCUMENTS

| | | | |
|---|---|---|---|
| 3,900,823 A | * 8/1975 | Sokal et al. | 330/149 |
| 4,970,656 A | * 11/1990 | Lo et al. | 364/481 |
| 5,267,262 A | * 11/1993 | Wheatley, III | 375/130 |
| 5,303,268 A | * 4/1994 | Tsutsumi et al. | 375/285 |
| 5,420,536 A | * 5/1995 | Faulkner et al. | 330/149 |
| 5,450,620 A | * 9/1995 | Vaisanen | 455/127 |
| 5,838,722 A | * 11/1998 | Consi | 375/219 |

OTHER PUBLICATIONS

American National Standards Institute (ANSI) "Network and Customer Installation Interfaces—Asymmetric Digital Subscriber Line (ADSL) Metallic Interface" (ANSI TI.413–1995), ANSI, Aug. 1995.

* cited by examiner

*Primary Examiner*—Don N. Vo
(74) *Attorney, Agent, or Firm*—J. Dennis Moore; W. James Brady, III; Frederick J. Telecky, Jr.

(57) ABSTRACT

A high performance data communications system (e.g., modem, transceiver, etc.) that has improved control over power dissipation is disclosed. The data communications system allows its power dissipation to be adaptively controlled so as to provide substantially improved control over the power dissipation of the data communications system than has been conventionally possible. The control over power dissipation can be performed only on transmissions, only on receptions, or on both transmissions and receptions. By suitably controlling the power dissipation, the power dissipation of the data communications system can be substantially reduced at lower power settings, while still supporting the higher power settings.

28 Claims, 7 Drawing Sheets

ADAPTIVE POWER DISSIPATION FOR DATA COMMUNICATIONS SYSTEM

BACKGROUND OF THE INVENTION

1. Field of the Invention

The present invention relates data communications systems and, more particularly, to power management for data communications systems.

2. Description of the Related Art

Today, it is very common that computer systems use modems and telephone lines to connect to other computer systems. Most of these modems provide fixed power level transmissions onto the telephone lines. Power supply voltage rails supplied to the modem are also normally set to accommodate the highest power. As a result, the power dissipation by the modem is normally fixed at a high amount.

In the case of high performance modems, such as digital subscriber line (DSL) modems, the power dissipation by the modems are also often fixed. Specifically, power supply voltage rails are set to accommodate the highest power, bias currents for line driver devices are constant, and transformer turn ratios are fixed. In such modems, the power dissipation is thus often fixed.

Recently, there have been some attempts to make minor improvements to the transmit power consumption of high performance modems. Such attempts at improving power dissipation were directed at controlling drive currents to driver circuitry. For example, often these approaches control the voltage level applied to the driver circuitry. With the driver circuitry having a fixed gain, the drive current levels supplied to a load on the telephone lines are thus reduced when the voltage level is reduced. Consequently, this recent approach does lead to some reduction in transmit power levels and system power dissipation. FIG. 1 discussed below is an example of the recent attempts to improve power dissipation by controlling drive currents levels of the driver circuitry.

FIG. 1 is a block diagram of a conventional high performance modem 100. The conventional high performance modem 100, for example, a DSL type modem. The conventional high performance modem 100 includes a modem signal processor 102, an analog front-end 104, a power amplification unit 106 and a line interface 108. The conventional high performance modem 100 performs both transmission and reception of data. Digital data (DATA) to be transmitted is received at the modem signal processor 102. Also, digital data (DATA) that has been received is obtained from the modem signal processor 102.

During transmission of data, the modem signal processor 102 performs various signal processing operations to modulate the data to be transmitted onto one or more carriers as well as to perform various filtering operations. The resulting digital data is then forwarded to the analog front-end 104 over a data bus (DATA BUS) 110. The analog front-end 104 converts the incoming digital data into analog signals, and outputs the analog signals as complimentary transmit signals. The complimentary transmit signals include transmit positive signals (TXP) and transmit negative signals (TXN). The complimentary transmit analog signals (TXP and TXN) are then supplied to the power amplification unit 106. The power amplification unit 106 includes power amplifiers that amplify the complimentary transmit analog signals (TXP and TXN). The amplified signals are then supplied to the line interface 108 that couples the amplified complimentary analog transmit signals to a subscriber line 112 (e.g., telephone line).

During reception of data, the conventional high performance modem 100 receives incoming analog signals from the subscriber line 112. The incoming analog signals are received by the line interface 108 which supplies complimentary received analog signals to the power amplification unit 106. The power amplification unit 106 produces received analog signals (RX) by amplifying the difference between the complimentary received analog signals. The received analog signals (RX) are then supplied to the analog front-end 104 where they are converted into digital receive signals and forwarded to the modem signal processor 102 over the data bus DATA BUS) 110. Thereafter, the modem signal processor 102 processes the received digital signals by demodulating the signal to recover the data originally transmitted.

In the conventional high performance modem 100, namely, a DSL type modem, the modem signal processor 102 includes circuitry or processing capabilities to determine whether transmit power should be increased or decreased given an amount of line impairments (e.g., noise, distortion, attenuation, etc.) that has been detected. The modem signal processor 102 is able to inform the analog front-end 104 via a control bus 114 as to whether the power level (i.e., drive current) used on the transmit analog signals (TXP and TXN) should be increased or decreased. In effect, the control bus 114, in this case, operates to control the drive current used by the analog front-end 104 in producing the transmit analog signals (TXP and TXN), which to a limited extent causes the transmit signals placed on the subscriber line 112 to carry more power or less power.

Additional details on DSL type modems can be found, for example, in U.S. Pat. Nos. 5,479,447; 5,596,604; 5,623,513; and 5,627,863, which are hereby incorporated by reference. Also particular details on an Asymmetric Digital Subscriber Line (ADSL) type modem can be found in American National Standards Institute (ANSI) published standard ANSI T1.413-1995, which are hereby incorporated by reference.

One problem of the convention approaches is that they do not yield sufficient control over power dissipation of modems. While the conventional high performance modem 100 illustrated in FIG. 1 provides some control over power dissipation, the degree with which these conventional approaches are able to control the power dissipation is minimal and therefore unsatisfactory. By better controlling power dissipation, many advantages can be achieved, including less energy consumption and less interference to other nearby modems.

Thus, there is a need for improved control over power dissipation by modems, in particular, high performance modems.

SUMMARY OF THE INVENTION

Broadly speaking, the invention relates to a high performance data communications system (e.g., modem, transceiver, etc.) that has improved control over power dissipation. In particular, the invention allows a data communications system to adaptively control its power dissipation so as to provide substantially improved control over the power dissipation than conventionally possible.

The invention can be implemented in numerous ways, including as an apparatus, system or method. Several embodiments of the invention are discussed below.

As data communications system for transmitting and receiving data over a link, an embodiment of the invention includes: a transmitter/receiver unit that receives digital data to be transmitted and produces modulated analog signals on one or more carriers for transmission over the link, and that receives incoming analog signals over the link and produces demodulated analog signals, and the transmitter/receiver unit includes a power controller that determines a power level setting and produces a bias current in accordance with the power level setting; and an amplifier stage operatively coupled between the link and the transmitter/receiver unit, the amplifier stage amplifies the incoming analog signals received over the link, and amplifies the modulated analog signals for transmission over the link based on at least the bias current produced in accordance with the power level setting. As an example, the data communications system provides power management by controlling the bias current supplied to the amplifier stage, such that as the power level setting is lowered, power consumption of the data communications system is reduced because the bias current is lowered.

Additionally, the power controller can optionally also produce a voltage control signal in accordance with the power level setting, and then provide power management by controlling not only the bias current supplied to the amplifier stage but also a supply voltage supplied to the amplifier stage in accordance with the voltage control signal. In such case, the amplification of the modulated analog signals for transmission over the link is based on at least the bias current and the voltage control signal. Still further, the power management can be provided by controlling each of the bias current, the supply voltage and a drive current which cooperate to amplify the incoming analog signals.

As a transmitter for a data transmission system using multicarrier modulation, an embodiment of the invention includes: a bit allocation table that stores bit allocation information for frequency tones of at least one frame; a data symbol encoder that receives digital data to be transmitted and encodes bits associated with the digital data to the frequency tones of the at least one frame based on the bit allocation information stored in the bit allocation table; a multicarrier modulation unit that modulates the encoded bits on the frequency tones of the at least one frame to produce modulated signals; a power controller that determines a power level setting and produces a bias current in accordance with the power level setting; a digital-to-analog converter that converts the modulated signals to analog signals; and an amplifier stage that amplifies the analog signals for transmission over a link based on at least the bias current produced in accordance with the power level setting.

As a method for adaptively managing power dissipation in a data transmission system having power supply circuit and a transmission power circuit that causes data to be transmitted at a determined transmission power level, an embodiment of the invention includes the operations of: receiving a control signal at the transmission power circuit that indicates the determined transmission power level at which data is to be transmitted; producing a current bias signal in accordance with the control signal; and managing power dissipation in the data transmission system by biasing amplifiers within the transmission power circuit that are used to amplify analog signals to be transmitted in accordance with the current bias signal. Further, the embodiment may also operate to produce a voltage control signal in accordance with the control signal, and then manage of the power dissipation in the data transmission system by further managing the power dissipation by controlling an output supply voltage that is supplied to the transmission power circuit by the power supply circuit in accordance with the voltage control signal.

As a method for managing power of a transmitter, an embodiment of the invention includes the acts of: receiving analog data signals to be transmitted over a link; determining a suitable supply voltage, a suitable bias current, and a suitable drive current based on transmission conditions; amplifying the analog data signals in accordance with the suitable supply voltage, the suitable bias current, and the suitable drive current; and coupling the amplified analog data signal to the link.

The advantages of the invention are numerous. One advantage of the invention is that power dissipation of a high performance data communications system (e.g., modem, transceiver, etc.) can be managed or controlled. Another advantage of the invention is that power utilization can adapt to the changing power requirements of the data communications system. Consequently, the overall system power utilization of the data communications system is able to be substantially reduced when high power levels are not needed. The reduced power utilization not only reduces power consumption and power source requirements but also reduces noise or interference caused by the resulting data transmissions.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention relates to a high performance data communications system (e.g., modem, transceiver, etc.) that has improved control over power dissipation. In particular, the invention allows a data communications system to adaptively control its power dissipation so as to provide substantially improved control over power dissipation than conventionally possible. The control over power dissipation provided by the invention can be performed only on transmissions, only on receptions, or on both transmissions and receptions.

According to the invention, a signal processing subsystem of a data communications system has control over a voltage bus, a drive current and a bias current for power amplifiers in a power amplification unit or driver circuitry of the data communications system. In such a system, the power rail voltage, the level of the drive current into the power amplifiers, and the bias current of the power amplifiers are able to be directly or indirectly controlled by the signal processing subsystem. Once an appropriate power level for a given connection has been established by the signal processing subsystem, three system parameters (i.e., voltage bus, drive current and bias current) can be controlled. By suitably controlling these three system parameters, the power dissipation can be substantially reduced at lower power settings. Specifically, the invention provides improved control of power dissipation by controlling one or both of the system parameters of the voltage bus and the bias current. However, the data communications system still supports the higher power levels, but is much more efficient at the lower power levels.

Embodiments of the invention are discussed below with reference to FIGS. 2–9. However, those skilled in the art will readily appreciate that the detailed description given herein with respect to these figures is for explanatory purposes as the invention extends beyond these limited embodiments.

Figure 1:
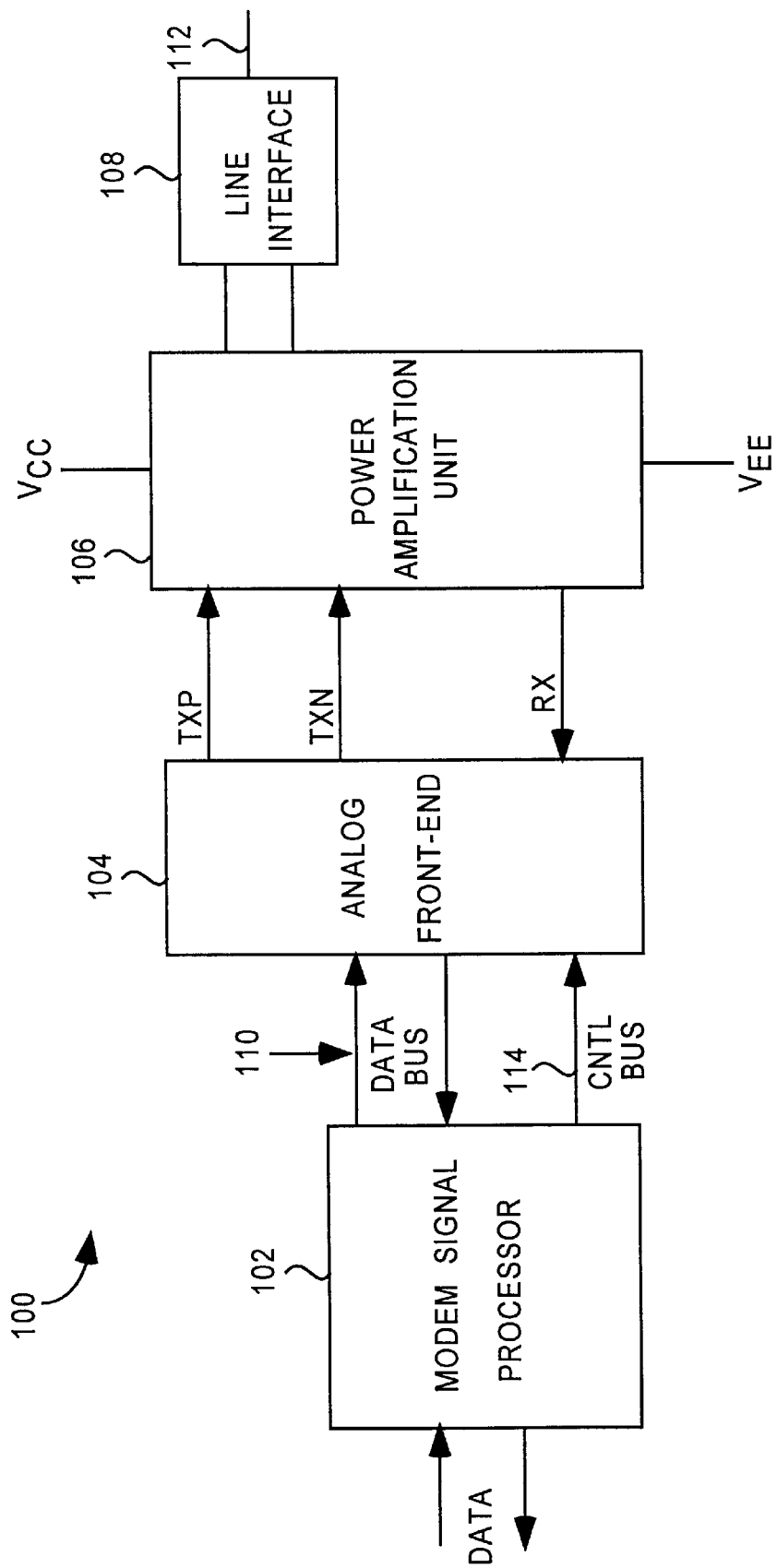
FIG. 1 is a block diagram of a conventional high performance modem.
Figure 2:
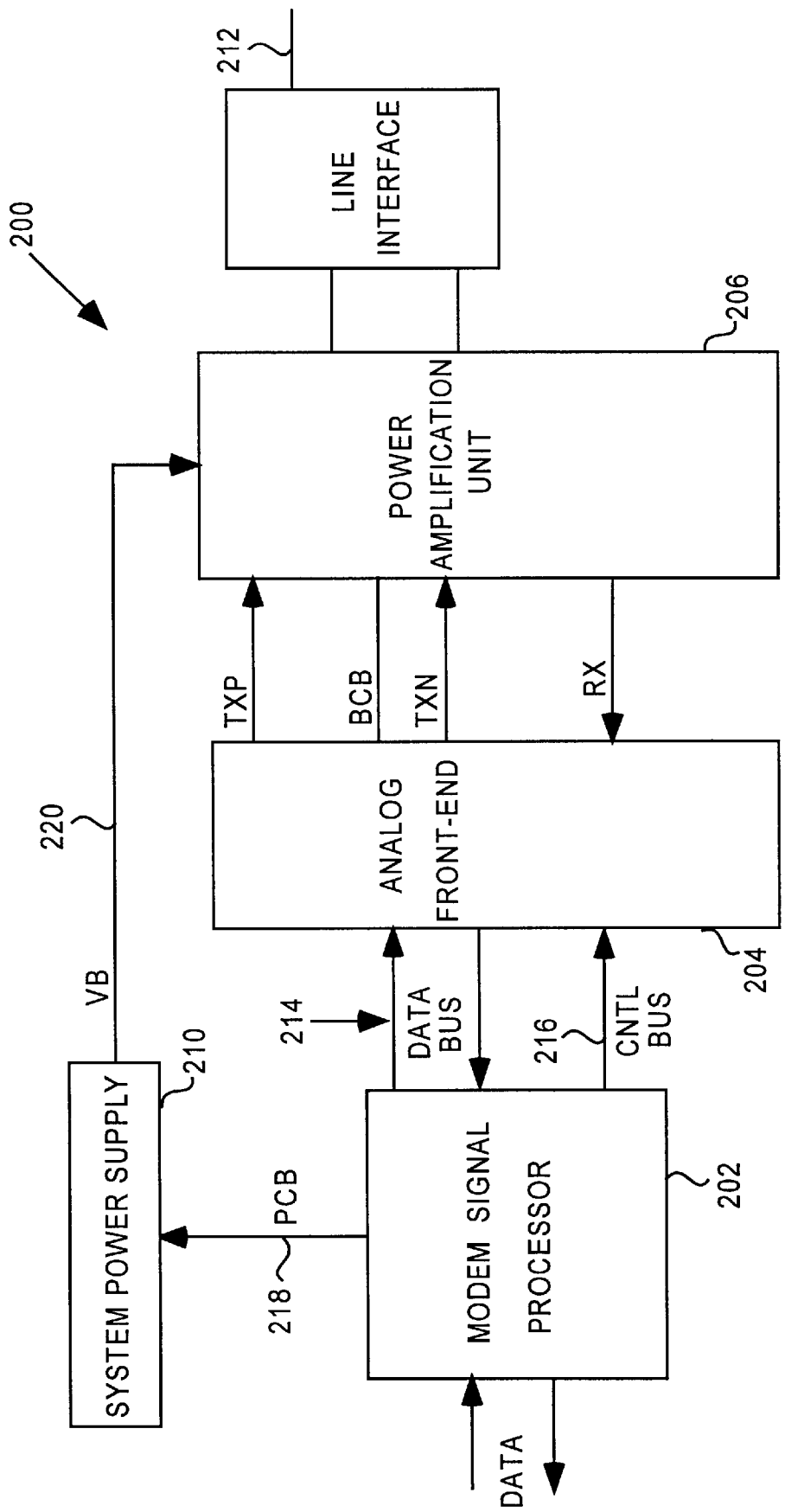
FIG. 2 is a block diagram of a high performance modem according to an embodiment of the invention.

FIG. 2 is a block diagram of a high performance modem 200 according to an embodiment of the invention. In one embodiment, the high performance modem 200 is a DSL type modem. The high performance modem 200 includes a modem signal processor 202, an analog front-end 204, a power amplification unit 206, a line interface 208, and a system power supply 210.

The modem signal processor 202 performs processing associated with modulation and demodulation as well as various filtering operations and control operations. Included within the control operations is the control over the power dissipation of the high performance modem 200. The modem signal processor 202 can be implemented by dedicated hardware circuitry, programmed hardware, or a special purpose processor (e.g., digital signal processor ASP)). The analog front-end 204 includes analog circuitry that among other things is responsible for performing digital-to-analog conversion as well as analog-to-digital conversion. The power amplification unit 206 includes power amplifiers that are used to amplify the signals to be transmitted as well as to amplify the signals received. The line interface 208 interfaces the high performance modem 200 to a subscriber line 212 (e.g., telephone line) so as to enable the transmission and reception of analog signals over the subscriber line 212. The system power supply 210 supplies power to at least the power amplification unit 206 of the high performance modem 200.

During transmission of data, the modem signal processor 202 performs various signal processing operations to modulate the data to be transmitted onto one or more carriers as well as to perform various filtering operations. The resulting digital data is then forwarded to the analog front-end 204 over a data bus (DATA BUS) 214. The analog front-end 204 converts the incoming digital data into analog signals, and outputs the analog signals as complimentary transmit signals. The complimentary transmit signals include transmit positive signals (TXP) and transmit negative signals (TXN). The complimentary transmit analog signals (TXP and TXN) are then supplied to the power amplification unit 206. The power amplification unit 206 includes power amplifiers that amplify the complimentary transmit analog signals (TXP and TXN). The amplified signals are then supplied to the line interface 208 that couples the amplified complimentary analog transmit signals to the subscriber line 212.

During reception of data, the high performance modem 200 receives incoming analog signals from the subscriber line 212. The incoming analog signals are received by the line interface 208 which supplies complimentary received analog signals to the power amplification unit 206. The power amplification unit 206 produces received analog signals (RX) by amplifying the difference between the complimentary received analog signals. The received analog signals (RX) are then supplied to the analog front-end 204 where they are converted into digital receive signals and forwarded to the modem signal processor 202 over the data bus (DATA BUS) 214. Thereafter, the modem signal processor 202 processes the received digital signal by demodulating the signals to recover the data originally transmitted.

In the high performance modem 200, the modem signal processor 202 includes circuitry or processing capabilities to determine whether transmit power should be increased or decreased. The modem signal processor 202 can make these power determinations based on an amount of noise or interference that has been detected on the subscriber line 212 and/or based on a requested power change by another modem that is exchanging data with the modem 200. The modem signal processor 202 is able to inform the analog front-end 204 via a control bus 216 as to whether a power level setting used on the transmit analog signals (TXP and TXN) and/or the receive analog signals (RX) should be increased or decreased. In effect, the control bus 216 operates to control the power dissipation of the high performance modem 200. For transmission of data, the control bus 216 informs the analog front-end 204 of the power level setting, and the then the analog front-end 204 produces (i) a drive current that drives driver circuitry to produce the complementary transmit signals (TXP and TXN) and (ii) a bias current bus (BCB) that sets a bias current for use by the power amplifiers in the power amplification unit 206.

Hence, when the modem signal processor 202 determines that the power level setting can be reduced from its a high power level, the modem signal processor 202 informs the analog front-end 204 over the control bus 216 that the power level is to be reduced. Then, in response to the requested reduction in power level, the analog front-end 204 operates to produce a lower drive current and a lower bias current (BCB). By lowering the bias current (BCB), the power amplifiers in the power amplification unit 206 perform less amplification of the complimentary transmit signals (TXP and TXN) and thus use less power.

Further, when the modem signal processor 202 determines that the power level setting can be reduced from its a high power level, the modem signal processor 202 informs the system power supply 210 of a requested voltage level over a power control bus (PCB) 218. In response, the system power supply 210 controls the output voltage on a voltage bus (VB) 220 such that it is in accordance with the requested voltage level. The output voltage on the voltage bus (VB) 220 is supplied to the power amplifiers within the power amplification unit 206. Consequently, given that the voltage supplied to the power amplifiers is reduced, the power dissipation by the power amplifiers in the power amplification unit 206 is reduced as the power level setting is reduced.

Figure 3:
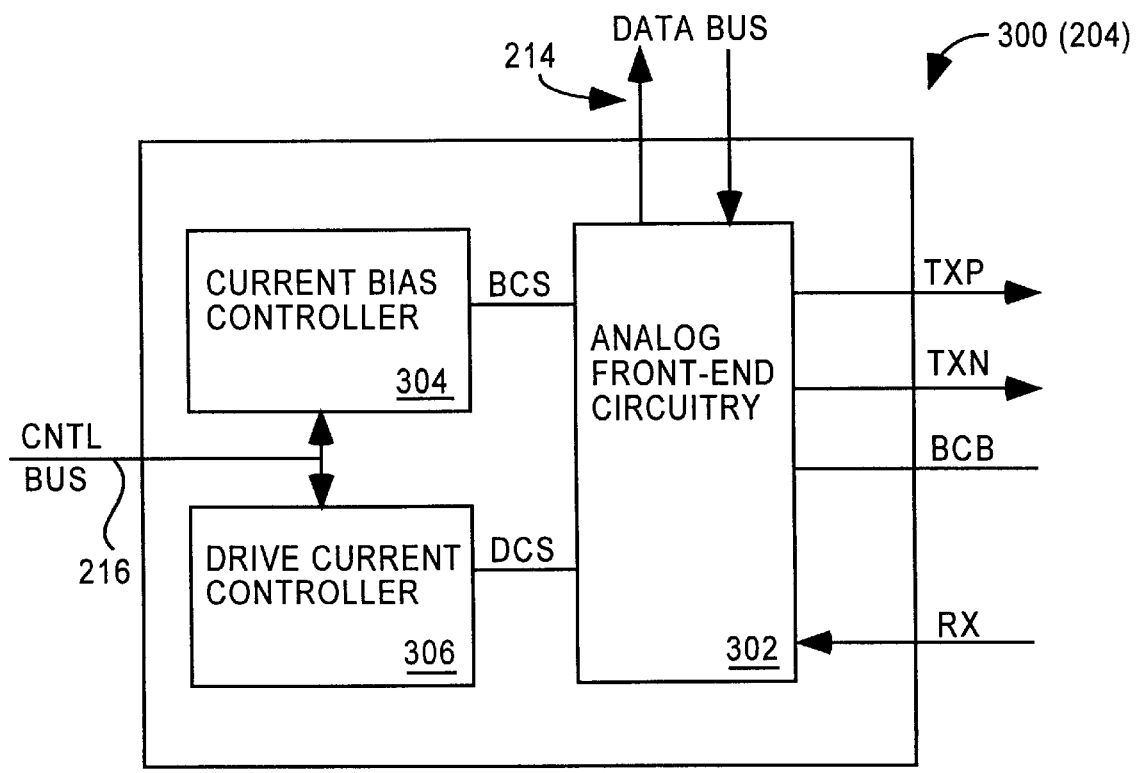
FIG. 3 is a block diagram of an analog front-end for a high performance modem according to an embodiment of the invention.

FIG. 3 is a block diagram of an analog front-end 300 for a high performance modem according to an embodiment of the invention. The analog front-end 300 is, for example, suitable for use as the analog front-end 204 illustrated in FIG. 2.

The analog front-end 300 includes analog front-end circuitry 302, a current bias controller 304, and a driver current controller 306. The analog front-end circuitry 302 receives data from the data bus (DATA BUS) 214 for transmission, and also supplies data to the data bus (DATA BUS) 214 upon reception. The primary tasks of the analog front-end circuitry 302 are (1) to convert the digital data to be transmitted into complimentary analog transmit signals (TXP and TXN) and (2) to convert incoming analog signals (RX) from the power amplification unit 206 into digital signals which are then supplied to the modem signal processor 202 over the data bus (DATA BUS) 214.

In order to assist in controlling power dissipation of the modem 200, the analog front-end 300 includes the current bias controller 304 and the drive current controller 306. Both the current bias controller 304 and the drive current controller 306 are coupled to the control bus 216. Using the control information carried on the control bus 216, the modem signal processor 202 is able to inform the analog front-end 300 of a desired power level setting for its transmissions and receptions. For a given power level setting, the current bias controller 304 produces a bias current select (BCS) signal. The bias current select (BCS) signal is supplied to the analog front-end circuitry 302. Using the bias current select (BCS) signal, the analog front-end circuitry 302 produces a bias current bus (BCB). The bias current bus (BCB) is forwarded to the power amplification unit 206 to control the bias current utilized in the power amplifiers in the power amplification unit 206 that amplify the transmit positive (TXP) and transmit negative (TXN) analog signals. Alternatively or additionally, the bias current bus (BCB) can be used by an amplifier in the power amplification unit 206 that amplifies the complementary receive signals to produce the receive analog signals (RX). Also, another bias current bus could be provided for the amplifier in the power amplification unit 206 that amplifies the complementary receive signals. The drive current controller 306 produces a drive current select (DCS) signal that informs the analog front-end circuitry 302 of the desired drive current used in driving the analog signals onto the transmit positive (TXP) and transmit negative (TXN) signal lines. The drive current select (DCS) signal is determined by the drive current controller 306 in accordance with the control information contained on the control bus 216.

Figure 4:
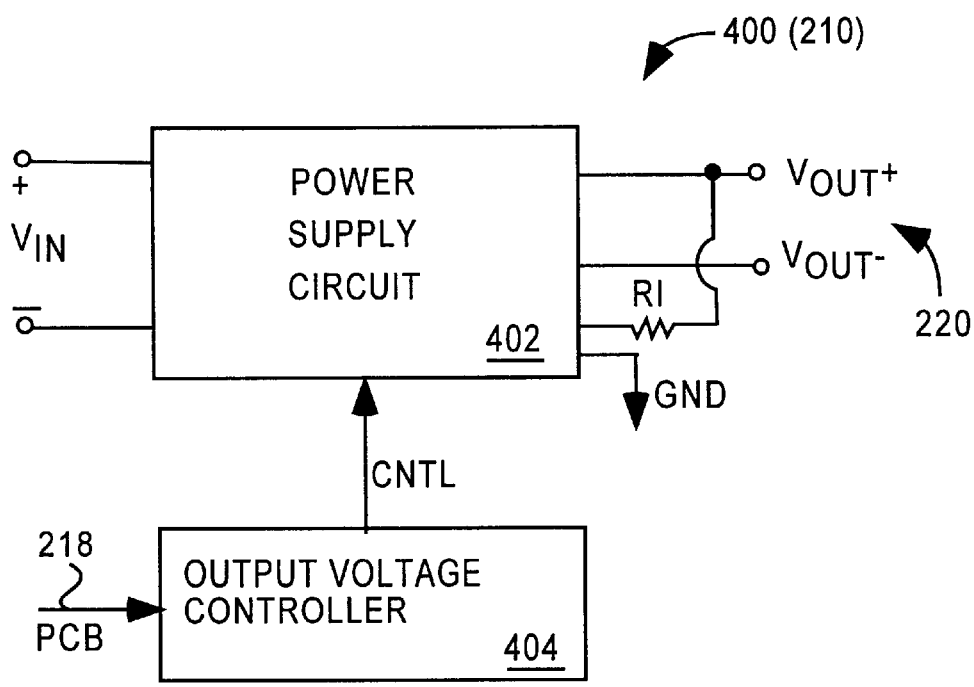
FIG. 4 is a block diagram of a system power supply for a high performance modem according to an embodiment of the invention.

FIG. 4 is a block diagram of a system power supply 400 for a high performance modem according to an embodiment of the invention. The system power supply 400 is, for example, suitable for use as the system power supply 210 illustrated in FIG. 2.

The system power supply 400 includes a power supply circuit 402 and an output voltage controller 404. The power supply circuit 402 receives an input voltage ($V_{IN}$) as well as a ground signal (GND). The output voltage controller 404 receives power control information over the power control bus (PCB) 218. The power control information instructs the output voltage controller 404 to provide a certain output voltage on the voltage bus (VB) 220. The output voltage controller 404 provides a voltage setting control signal (CNTL) to the power supply circuit 402 that controls the output voltage on the voltage bus (VB) 220 such that it is in accordance with the requested voltage level. The power supply circuit 402 monitors the output voltage using a reference voltage ($V_{REF}$). The power supply circuit 402 can adjust the output voltage supplied to the voltage bus (VB) 220 by varying the voltage setting control signal (CNTL) supplied to the power supply circuit 402.

Figure 5:
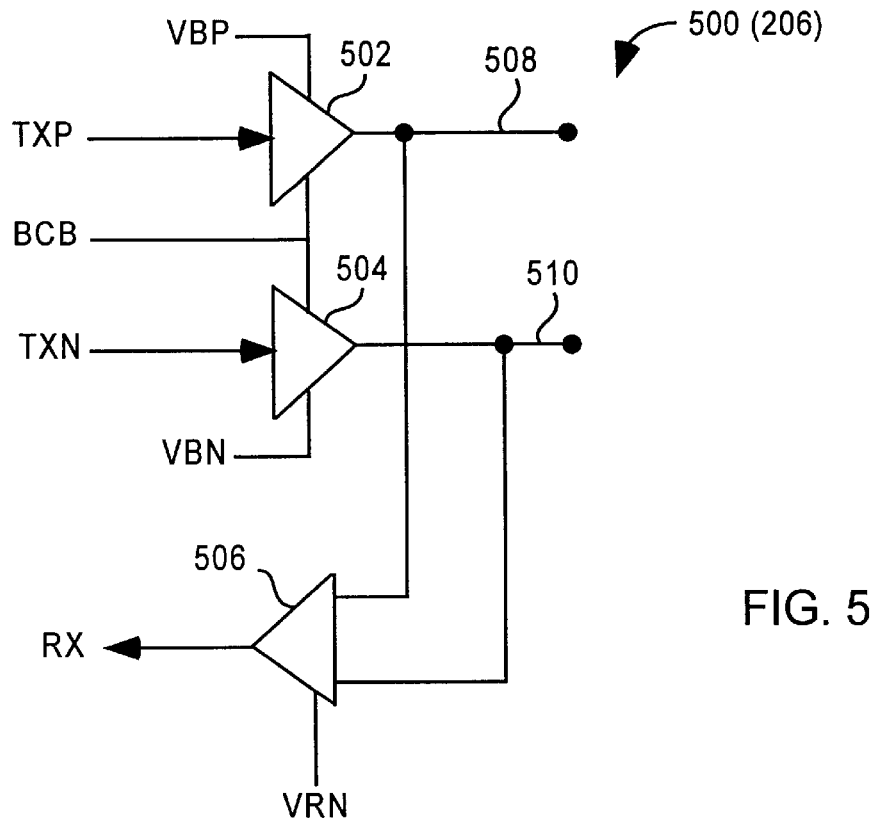
FIG. 5 is a schematic diagram of power amplification circuitry for a high performance modem according to an embodiment of the invention.

FIG. 5 is a schematic diagram of power amplification circuitry 500 for a high performance modem according to an embodiment of the invention. The power amplification circuitry 500 is, for example, suitable for use in the power amplification unit 206 illustrated in FIG. 2.

The power amplification circuitry 500 includes power amplifiers 502 and 504 for transmission of analog signals, and includes a differential amplifier 506 for reception of analog signals. The power amplifiers 502 and 504 receive bias currents from the bias current bus (BCB). Actually, in this embodiment, the bias current bus (BCB) will sink current as opposed to source current to the power amplifiers 502 and 504. The power amplifiers 502 and 504 are each coupled to the voltage bus (VB) 220. More particularly, each of the power amplifiers 502 and 504 are coupled to a positive potential supplied by a positive portion of the voltage bus (VBP) and a negative voltage supplied by a negative portion of the voltage bus (VBN). The power amplifier 502 receives the transmit positive analog signals (TXP), amplifies the transmit positive signals (TXP), and then outputs the resulting amplified analog signals to the line interface 208 over line 508. The power amplifier 504 receives the transmit negative analog signals (TXN), amplifies the analog signals, and then outputs the amplified signals to the line interface 208 over line 510. The degree or amount of amplification provided by the power amplifiers 502 and 504 is controlled by the drive current of the complimentary transmit signals (TXP and TXN), by the current on the bias current bus (BCB), and the voltage on the voltage bus (VB) 220.

The differential amplifier 506 receives the complimentary incoming receive signals from the lines 508 and 510. The differential amplifier 506 is powered by a positive receive voltage (VRP) and a negative receive voltage (VRN). In certain embodiments, the receive voltages (VRP and VRN) are fixed to voltage levels. However, it should be noted that the received voltages (VRP and VRN) could also be supplied by the voltage bus (VB) 220, though normally the received voltages for the differential amplifier 506 would be scaled down from that (i.e., VBP and VBN) used by the power amplifiers 502 and 504. Also, the system power supply 210 could also be used to produce another voltage bus that would allow for controlled voltage levels (VRP and VRN) to be supplied to the differential amplifier 506. The output of the differential amplifier 506 is the receive analog signal (RX). Here, the degree or amount of amplification provided by the differential amplifier 506 is controlled by voltages VRP and VRN.

Figure 6:
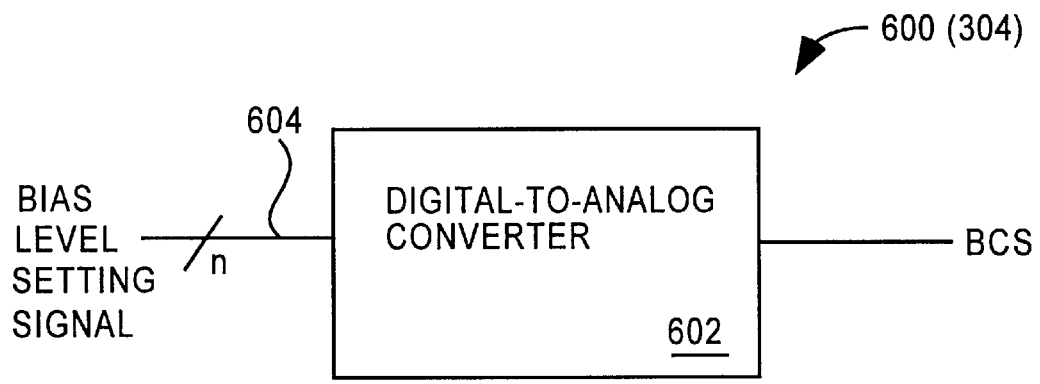
FIG. 6 is a block diagram of a current bias controller for a high performance modem according to an embodiment of the invention.

FIG. 6 is a block diagram of a current bias controller 600 for a high performance modem according to an embodiment of the invention. The current bias controller 600 is, for example, suitable for use as the current bias controller 304 illustrated in FIG. 3. More particularly, the current bias controller 600 includes a digital-to-analog converter 602. The digital-to-analog converter 602 receives a bias level setting signal 604 that includes a plurality of bits (n-bits). The bias level setting signal 604 can be supplied or obtained from the control bus 216. In any event, the digital-to-analog converter 602 receives the bias level setting signal 604 and outputs a bias current selection signal (BCS). As shown in FIG. 3, the bias current selection signal (BCS) is supplied to the analog front-end circuitry 302.

Figure 7:
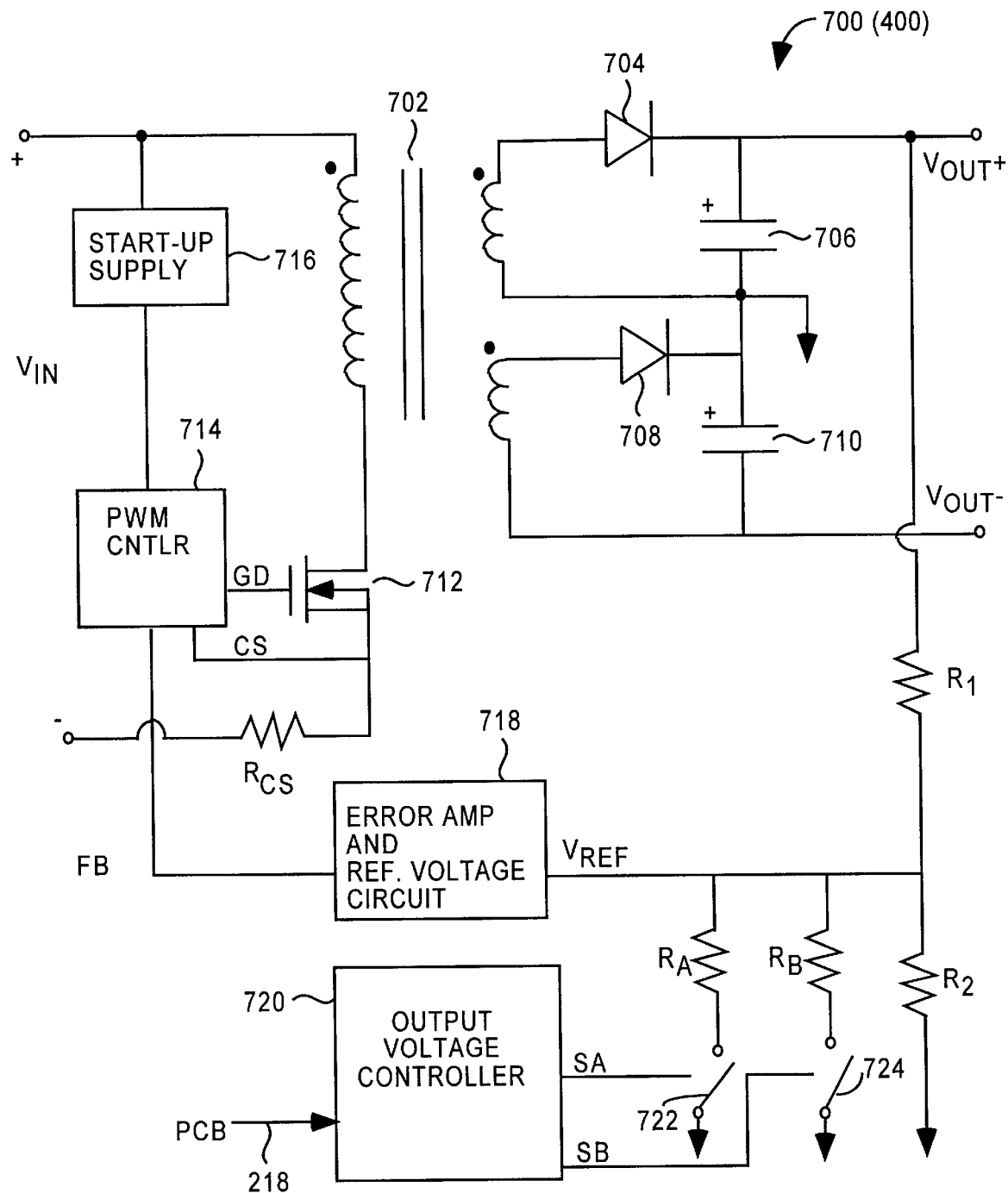
FIG. 7 is a schematic diagram of a system power supply for a high performance modem according to an embodiment of the invention.

FIG. 7 is a schematic diagram of a system power supply 700 for a high performance modem according to an embodiment of the invention. The system power supply 700 is, for example, suitable for use as the system power supply 400 illustrated in FIG. 4.

Specifically, the power supply system 700 outputs complimentary output voltages ($V_{OUT}+$ and $V_{OUT}-$) that are supplied to the voltage bus (VB) 220. A transformer 702 receives an input voltage ($V_{IN}$). The input voltage ($V_{IN}$) is, for example, a DC voltage of 5–100 Volts depending on the application. The transformer 702 has an input side winding and first and second output side windings. The first and second output side windings of the transformer 702 respectively produce the complimentary output voltages ($V_{OUT}+$ and $V_{OUT}-$). In particular, the output side of the transformer 702 has a first a diode 704 and a capacitor 706 are coupled across the first output side winding, and the positive output voltage ($V_{OUT}+$) is obtained from a node interconnecting the diode 704 and the capacitor 706. Likewise, with respect to the second output side winding, a diode 708 and a capacitor 710 are connected in series across the second output winding. The negative output voltage ($V_{OUT}-$) is obtained from the negative side of the second output winding.

A control transistor 712 receives a gate drive signal (GD) from a pulse width modulation (PWM) controller 714. The gate drive signal (GD) is a periodic signal that turns the control transistor 712 on and off at a given frequency. The secondary windings of the transformer 702 together with the diodes 704 and 708 as well as the capacitors 706 and 710 operate to rectify the voltage appearing at the primary side of the transformer 702 to produce nearly constant DC level voltage outputs for the complimentary output voltages $V_{OUT}+$ and $V_{OUT}-$. The PWM controller 714 also receives a feedback signal (FB) from an error amplifier and reference voltage circuit 718. The error amplifier and reference voltage circuit 718 receives a reference voltage ($V_{REF}$) which is scaled version of the output voltage ($V_{OUT}+$) that is obtained by dividing by resistors $R_1$ and $R_2$ that form a voltage divider circuit. The feedback signal (FB) thus allows the power supply system 700 to monitor the for the complimentary output voltages $V_{OUT}+$ and $V_{OUT}-$ so that the voltage can by monitored and adjusted as necessary. The feedback signal (FB) is used by the PWM controller 714 to control the frequency at which the gate drive signal (GD) activates the control transistor 712. As the frequency is increased, the voltage level for the output voltages ($V_{OUT}+$ and $V_{OUT}-$) increases. The PWM controller 714 also makes use of a current sense resistor ($R_{CS}$) and a current sense signal (CS) so as to monitor the current flowing between drain and source of the control transistor 712. In one embodiment, the control transistor 712 is a power MOSFET. Further, the power supply system 700 includes a start-up supply 716 that supplies power during a start-up period.

Further, the power supply circuit 700 includes an output voltage controller 720. The output voltage controller 720 receives a power level setting signal over the power control bus (PCB) 218. In accordance with the power level setting, the output voltage controller 720 may set switches 722 and 724 using switch select signals $S_A$ and $S_B$. These switch select signals are used to activate or deactivate the switches 722 and 724 so as to add additional resistance into the voltage divider circuit. With switches 722 and 724 open, the output voltage ($V_{OUT}+$) is divided by resistors $R_1$ and $R_2$ that form the voltage divider circuit to obtain the reference voltage ($V_{REF}$). The reference voltage ($V_{REF}$) is then supplied to the error amplifier and reference voltage circuit 718. Additionally, the switches 722 and 724 are provided so as to optionally add the resistances $R_A$ and $R_B$ into the voltage divider circuit. At different power level settings, the switches 722 and 724 are able to alter the magnitude of the reference voltage ($V_{REF}$) (i.e., scale it to a nominal value) so that the power supply circuit 700 is able to handle the entire range of output voltages. The switches 722 and 724 are preferably implemented by field effect transistor switches.

Figure 8:
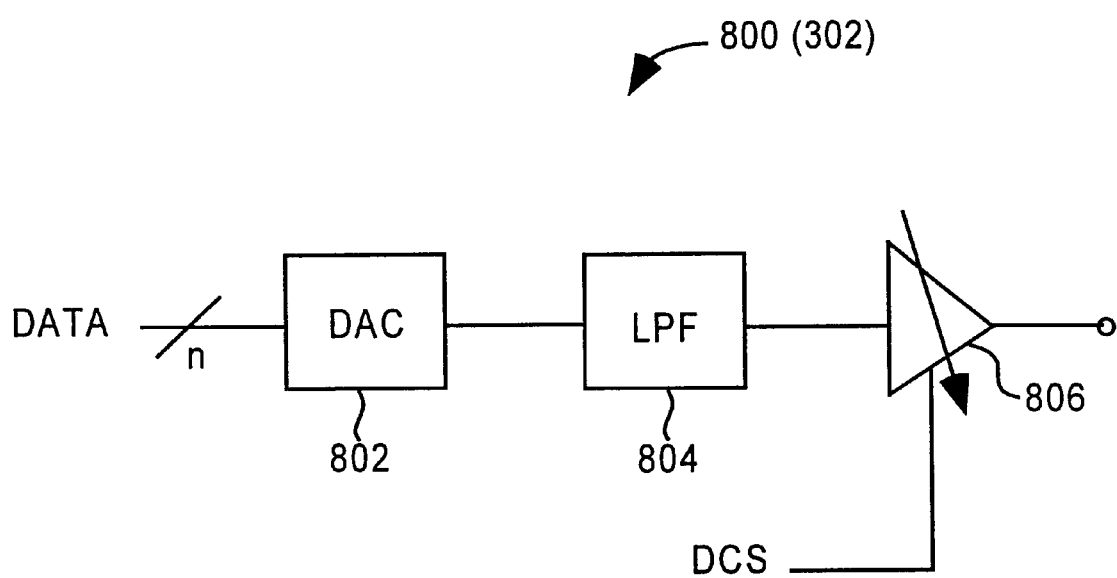
FIG. 8 is a block diagram of analog transmission circuitry for a high performance modem according to an embodiment of the invention.

FIG. 8 is a block diagram of analog transmission circuitry 800 for a high performance modem according to an embodiment of the invention. The analog transmission circuitry 800 is, for example, suitable for use as a portion of the analog front-end circuitry 302 illustrated in FIG. 3. The analog transmission circuitry 800 receives digital data of n-bits at a digital-to-analog converter (DAC) 802. The digital data to be transmitted is received over the data bus 214 (DATA BUS). The DAC 802 converts the incoming data signals into analog signals. The analog signals are then low-pass filtered by a low pass filter 804. The resulting filtered signals are then supplied to a transmit attenuator 806. The transmit attenuator 806 attenuates the analog signals to be transmitted in accordance with the drive current signal (DCS). The drive current signal (DCS) is determined in accordance with the power level setting determined by the modem signal processor 202 and supplied to the analog transmission circuitry 800 from the drive current controller 306. Subsequently, the attenuated transmit signals are converted by other portions of the analog front-end circuitry 302 into the transmit positive analog signals (TXP) and the transmit negative analog signals (TXN).

The high performance data communications system (e.g., modem) according to the invention has improved control over power dissipation. Comparative data for a representative DSL modem is provided in Tables 1, 2 and 3 below.

Table 1 provided below illustrates line driver dissipation for a conventional DSL system with fixed system parameters (i.e., bias current and supply voltage) as discussed above in the background of the invention. In the conventional DSL system, although the bias current and the supply voltage are fixed, the drive current does change with the various power level settings.

TABLE 1

| Power Level | 23 dBm | 20 dBm | 17 dBm | 14 dBm | 11 dBm | 7 dBm |
|---|---|---|---|---|---|---|
| Drive Current | 81.3 mA | 57.6 mA | 40.9 mA | 28.8 mA | 20.5 mA | 12.9 mA |
| Bias Current | 60 mA | 60 mA | 60 mA | 60 mA | 60 mA | 60 mA |
| Supply Voltage | 30 V | 30 V | 30 V | 30 V | 30 V | 30 V |
| Power Dissipation | 4.24 W | 3.53 W | 3.03 W | 2.66 W | 2.42 W | 2.19 W |

Table 2 provided below illustrates power dissipation of a DSL system according to an embodiment of the invention. In this embodiment, each of the bias current, the supply voltage and the drive current are adaptive to the various power level settings. It should be noted that, in this example, the drive current, bias current and the supply voltage are each controlled so as to be reduced as the power level setting for the DSL system is decreased.

TABLE 2

| Power Level | 23 dBm | 20 dBm | 17 dBm | 14 dBm | 11 dBm | 7 dBm |
| --- | --- | --- | --- | --- | --- | --- |
| Drive Current | 81.3 mA | 57.6 mA | 40.9 mA | 28.8 mA | 20.5 mA | 12.9 mA |
| Bias Current | 60 mA | 50 mA | 40 mA | 30 mA | 20 mA | 15 mA |
| Supply Voltage | 30 V | 24 V | 20 V | 16 V | 10 V | 10 V |
| Power Dissipation | 4.24 W | 2.58 W | 1.61 W | 0.94 W | 0.41 W | 0.28 W |

Table 3 provided below illustrates the power savings for the DSL system according to an embodiment of the invention with the power dissipation as shown in Table 2 as compared to the conventional DSL system with the power dissipation shown in Table 1.

TABLE 3

| Power Level | Power Savings |
| --- | --- |
| 23 dBm | None |
| 20 dBm | 0.95 W |
| 17 dBm | 1.42 W |
| 14 dBm | 1.72 W |
| 11 dBm | 2.00 W |
| 7 dBm | 1.91 W |

DSL type modems are high performance modems that normally use multicarrier modulation techniques. Such multicarrier modulation techniques provide high-speed data communication. One standard for DSL type high-speed data communications over twisted-pair phone lines that has developed is known as Asymmetric Digital Subscriber Lines (ADSL). Another standard for high-speed data communications over twisted-pair phone lines that is presently proposed is known as Very High Speed Digital Subscriber Lines (VDSL).

The Alliance For Telecommunications Information Solutions (ATIS), which is a group accredited by the ANSI (American National Standard Institute) Standard Group, has finalized a discrete multi-tone based approach for the transmission of digital data over ADSL. The standard is intended primarily for transmitting video data and fast Internet access over ordinary telephone lines, although it may be used in a variety of other applications as well. The North American Standard is referred to as the ANSI T1.413 ADSL Standard (hereinafter ADSL standard). Transmission rates under the ADSL standard are intended to facilitate the transmission of information at rates of up to 8 million bits per second (Mbits/s) over twisted-pair phone lines. The standardized system defines the use of a discrete multi-tone (DMT) system that uses 256 "tones" or "sub-channels" that are each 4.3125 kHz wide in the forward (downstream) direction. In the context of a phone system, the downstream direction is defined as transmissions from the central office (typically owned by the telephone company) to a remote location that may be an end-user (i.e., a residence or business user). In other systems, the number of tones used may be widely varied. However when modulation is performed efficiently using an inverse fast Fourier transform (IFFT), typical values for the number of available sub-channels (tones) are integer powers of two, as for example, 128, 256, 512, 1024 or 2048 sub-channels.

The ADSL standard also defines the use of a reverse signal at a data rate in the range of 16 to 800 Kbit/s. The reverse signal corresponds to transmission in an upstream direction, as for example, from the remote location to the central office. Thus, the term ADSL comes from the fact that the data transmission rate is substantially higher in the downstream direction than in the upstream direction. This is particularly useful in systems that are intended to transmit video programming or video conferencing information to a remote location over telephone lines.

Because both downstream and upstream signals travel on the same pair of wires (that is, they are duplexed) they must be separated from each other in some way. The method of duplexing used in the ADSL standard is Frequency Division Duplexing (FDD) or echo canceling. In frequency division duplexed systems, the upstream and downstream signals occupy different frequency bands and are separated at the transmitters and receivers by filters. In echo cancel systems, the upstream and downstream signals occupy the same frequency bands and are separated by signal processing.

ANSI is producing another standard for a subscriber line based transmission system, which is referred to as the VDSL standard. The VDSL standard is intended to facilitate transmission rates of at least about 6 Mbit/s and up to about 52 Mbit/s or greater in the downstream direction. To achieve these rates, the transmission distance over twisted-pair phone lines must generally be shorter than the lengths permitted using ADSL. Simultaneously, the Digital, Audio and Video Council (DAVIC) is working on a similar system, which is referred to as Fiber To The Curb (FTTC). The transmission medium from the "curb" to the customer is standard unshielded twisted-pair (UTP) telephone lines.

A number of modulation schemes have been proposed for use in the VDSL and FTTC standards (hereinafter VDSL/FTTC). For example, some of the possible VDSL/FTTC modulation schemes include multi-carrier transmission schemes such as Discrete Multi-Tone modulation (DMT) or Discrete Wavelet Multi-Tone modulation (DWMT), as well as single carrier transmission schemes such as Quadrature Amplitude Modulation (QAM), Carrierless Amplitude and Phase modulation (CAP), Quadrature Phase Shift Keying (QPSK), or vestigial sideband modulation.

Most of the proposed VDSL/FTTC modulation schemes utilize frequency division duplexing of the upstream and downstream signals. One particular proposed VDSL/FTTC modulation scheme uses periodic synchronized upstream and downstream communication periods that do not overlap with one another. That is, the upstream and downstream communication periods for all of the wires that share a binder are synchronized. When the synchronized time division duplexed approach is used with DMT it is referred to as synchronized DMT (SDMT). With this arrangement, all the very high speed transmissions within the same binder are synchronized and time division duplexed such that downstream communications are not transmitted at times that overlap with the transmission of upstream communications. This is also referred to as a (i.e. "ping pong") based data transmission scheme. Quiet periods, during which no data is transmitted in either direction, separate the upstream and downstream communication periods.

A common feature of the above-mentioned transmission systems is that twisted-pair phone lines are used as at least a part of the transmission medium that connects a central office (e.g., telephone company) to users (e.g., residence or business). It is difficult to avoid twisted-pair wiring from all parts of the interconnecting transmission medium. Even though fiber optics may be available from a central office to the curb near a user's residence, twisted-pair phone lines are used to bring in the signals from the curb into the user's home or business.

The twisted-pair phone lines are grouped in a binder. While the twisted-pair phone lines are within the binder, the binder provides reasonably good protection against external electromagnetic interference. However, within the binder, the twisted-pair phone lines induce electromagnetic interference on each other. This type of electromagnetic interference is generally known as crosstalk interference which includes near-end crosstalk (NEXT) interference and far-end crosstalk (FAR) interference. As the frequency of transmission increases, the crosstalk interference becomes substantial. As a result, the data signals being transmitted over the twisted-pair phone lines at high speeds or at high power levels can be significantly degraded by the crosstalk interference caused by other twisted-pair phone lines in the binder. As the speed of the data transmission or power level increases, the problem worsens.

Figure 9:
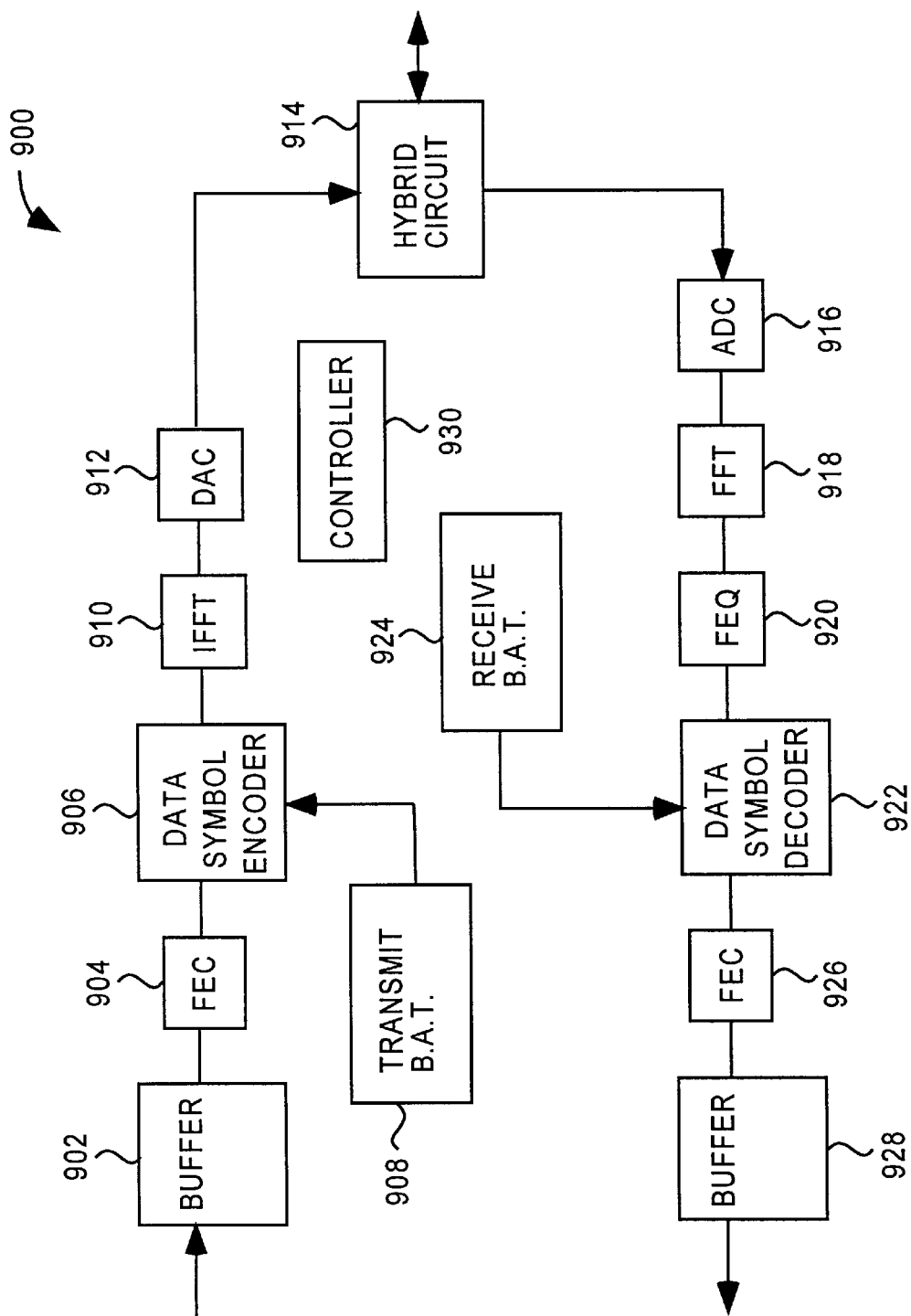
FIG. 9 is a block diagram of a transceiver according to an embodiment of the invention.

FIG. 9 is a block diagram of a transceiver 900 according to an embodiment of the invention. The transceiver 900 in this embodiment is suitable for use as a DSL type modem (e.g., ADSL or VDSL) and is assumed to be using multi-carrier modulation system. The transceiver 900 has both a transmitter side and a receiver side and is suitable for bi-directional data transmission. The transmitter side transmits data by supplying it to the buffer 902. The data is then obtained from the buffer 902 and supplied to a forward error correction (FEC) unit 904. The FEC unit 904 compensates for errors that are due to crosstalk noise, impulse noise, channel distortion, etc. The signals output by the FEC unit 904 are supplied to a data symbol encoder 906. The data symbol encoder 906 operates to encode the data onto frequency tones of a symbol based on bit allocation information obtained from a transmit bit allocation table 908. The encoded data is then supplied to an Inverse Fast Fourier Transform (IFFT) unit 910 which modulates the data and converts the modulated data into time domain data. The time domain data is then converted to analog signals by a digital-to-analog converter (DAC) 912. The analog signals are then supplied to a hybrid circuit 914 and transmitted over a channel.

The receiver side of the transceiver 900 receives analog signals that have been transmitted over a channel via the hybrid circuit 914. The received analog signals are then supplied to an analog-to-digital converter (ADC) 916 which converts the received analog signals to digital signals. The digital signals are then supplied to a Fast Fourier Transform (FFT) unit 918 that demodulates the digital signals while converting the digital signals from a time domain to a frequency domain, thus producing frequency domain signals. The frequency domain signals are then equalized by a frequency domain equalizer FEQ unit 920. The FEQ unit 920 performs an equalization on the digital signals so the attenuation and phase are equalized over the various frequency tones. The equalized signals are then supplied to a data symbol decoder 922. The data symbol decoder 922 operates to decode the equalized signals to recover data that has been transmitted on each of the frequency tones of the symbol being received. The decoding by the data symbol decoder 922 is performed based on bit allocation information stored in a receive bit allocation table 924. The decoded data is then supplied to a forward error correction (FEC) unit 926 and then stored in the buffer 928. The FEC unit 926 performs error correction of the data to produce corrected data. The corrected data is then stored in a buffer 928. Thereafter, the data may be retrieved from the buffer 928 and further processed by the transceiver 900.

The transceiver 900 also includes a controller 930 that controls the overall operation of the transceiver 900 including the controlling of power dissipation particularly of power amplifiers of a power amplification unit which in FIG. 9 would be either not shown or within the hybrid circuit 914. As an example, the controller 930 would correspond to the signal processor 202 illustrated in FIG. 2. In the transceiver 900, by controlling the power dissipation of the transmitter side, the reception of signals at the receive side is made easier because less interference would be present. Also, in the case where there are several transceivers 900 (or transmitters) at a central location to service a plurality of subscriber lines, then the management of power dissipation of the transceivers and/or transmitters not only helps with interference among the various transceivers/transmitters but also serves to lower the overall power requirements of the central location. Hence, the invention is particularly beneficial in such situations.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A data communications system for transmitting and receiving data over a link, said data communications system comprising:

a transmitter/receiver unit that receives digital data to be transmitted and produces modulated analog signals on one or more carriers for transmission over the link, and that receives incoming analog signals over the link and produces demodulated analog signals, and said transmitter/receiver unit includes a power controller that determines a power level setting and produces a bias current in accordance with the power level setting; and an amplifier stage operatively coupled between the link and said transmitter/receiver unit, said amplifier stage amplifies the incoming analog signals received over the link, and amplifies the modulated analog signals for transmission over the link based on at least the bias current produced in accordance with the power level setting.

2. A data communications system as recited in claim 1, wherein said data communications system provides power management by controlling the bias current supplied to said amplifier stage, such that as the power level setting is lowered, power consumption of said data communications system is reduced due to the lowering of the bias current.

3. A data communications system as recited in claim 1, wherein said amplifier stage includes amplifiers that perform the amplifying of the incoming analog signals, said amplifiers are biased in accordance with the bias current.

4. A data communications system as recited in claim 3, wherein said power controller comprises:

a current bias circuit that produces the bias current for the amplifiers in said amplifier stage; and a drive current controller that produces a drive current for the amplifiers in said amplifier stage.

5. A data communications system as recited in claim 1, wherein said power controller of said transmitter/receiver unit also produces a voltage control signal in accordance with the power level setting, wherein said data communications system further comprises a power supply device that supplies a supply voltage to said amplifier stage in accordance with the voltage control signal, and wherein the amplification of the modulated analog signals for transmission over the link is based on at least the bias current and the supply voltage.

6. A data communications system as recited in claim 5, wherein said data communications system provides power management by controlling the bias current and the voltage control signal supplied to said amplifier stage, such that as the power level setting is lowered, power consumption of said data communications system is reduced due to the lowering of the bias current as well as the lowering of the supply voltage in accordance with the voltage control signal.

7. A data communications system as recited in claim 6, wherein said amplifier stage includes amplifiers that perform the amplifying of the incoming analog signals, said amplifiers are coupled to the supply voltage and biased in accordance with the bias current.

8. A data communications system as recited in claim 7, wherein said power controller comprises:

a current bias circuit that produces the bias current for the amplifiers in said amplifier stage;

a voltage level controller that produces the voltage control signal that is used by said power supply device; and a drive current controller that produces a drive current for the amplifiers in said amplifier stage.

9. A data communications system as recited in claim 8, wherein the bias current, the supply voltage and the drive current are all determined in accordance with the power level setting.

10. A transmitter for a data transmission system using multicarrier modulation, said transmitter comprising:

a bit allocation table, said bit allocation table stores bit allocation information for frequency tones of at least one frame;

a data symbol encoder, said data symbol encoder receives digital data to be transmitted and encodes bits associated with the digital data to the frequency tones of the at least one frame based on the bit allocation information stored in said bit allocation table;

a multicarrier modulation unit, said multicarrier modulation unit modulates the encoded bits on the frequency tones of the at least one frame to produce modulated signals;

a power controller that determines a power level setting and produces a bias current in accordance with the power level setting;

a digital-to-analog converter operatively coupled to said multicarrier modulation unit, said digital-to-analog converter converts the modulated signals to analog signals; and an amplifier stage operatively coupled to said digital-to-analog converter, said amplifier stage amplifies the analog signals for transmission over a link based on at least the bias current produced in accordance with the power level setting.

11. A transmitter as recited in claim 10, wherein the link over which the analog signals are transmitted is a discrete subscriber line.

12. A transmitter as recited in claim 10, wherein said multicarrier modulation unit modulates the encoded bits on the frequency tones of a symbol using Discrete Multi Tone (DMT) modulation.

13. A transmitter as recited in claim 10, wherein the power level setting determined by said power controller provides power management by controlling the bias current supplied to said amplifier stage, such that as the power level setting is lowered, power consumption of said transmitter is reduced due to the lowering of the bias current.

14. A transmitter as recited in claim 10, wherein said amplifier stage includes amplifiers that perform the amplifying of the analog signals, said amplifiers are biased in accordance with the bias current.

15. A transmitter as recited in claim 14, wherein said power controller comprises:

a current bias circuit that produces the bias current for the amplifiers in said amplifier stage; and a drive current controller that produces a drive current for the amplifiers in said amplifier stage.

16. A transmitter as recited in claim 10, wherein said power controller also produces a voltage control signal in accordance with the power level setting, wherein said transmitter further comprises a power supply device that supplies a supply voltage to said amplifier stage in accordance with the voltage control signal, and wherein the amplification of the analog signals for transmission over the link is based on at least the bias current and the voltage control signal.

17. A transmitter as recited in claim 16, wherein the link over which the analog signals are transmitted is a discrete subscriber line, and wherein said multicarrier modulation unit modulates the encoded bits on the frequency tones of a symbol using Discrete Multi Tone (DMT) modulation.

18. A transmitter as recited in claim 16, wherein said transmitter provides power management by controlling the bias current and the supply voltage supplied to said amplifier stage, such that as the power level setting is lowered, power consumption of said transmitter is reduced due to the lowering of the bias current as well as the lowering of the supply voltage in accordance with the voltage control signal.

19. A transmitter as recited in claim 18, wherein said amplifier stage includes amplifiers that perform the amplifying of the analog signals, said amplifiers are coupled to the supply voltage and biased in accordance with the bias current.

20. A transmitter as recited in claim 19, wherein said power controller comprises:

a current bias circuit that produces the bias current for the amplifiers in said amplifier stage;

a voltage level controller that produces the voltage control signal that is used by said power supply device; and a drive current controller that produces a drive current for the amplifiers in said amplifier stage.

21. A transmitter as recited in claim 20, wherein the bias current, the voltage control signal and the drive current are all determined in accordance with the power level setting.

22. A method for adaptively managing power dissipation in a data transmission system having power supply circuit and a transmission power circuit that causes data to be transmitted at a determined transmission power level, said method comprising:

(a) receiving a control signal at the transmission power circuit that indicates the determined transmission power level at which data is to be transmitted;

(b) producing a current bias signal in accordance with the control signal; and (c) managing power dissipation in the data transmission system by biasing amplifiers within the transmission power circuit that are used to amplify analog signals to be transmitted in accordance with the current bias signal.

23. A method as recited in claim 22, wherein said method further comprises (d) producing a voltage control signal in accordance with the control signal, and wherein said managing (c) of the power dissipation in the data transmission system further manages the power dissipation by controlling an output supply voltage that is supplied to the transmission power circuit by the power supply circuit in accordance with the voltage control signal.

24. A method as recited in claim 23, wherein said managing (c) of the power dissipation causes the output supply voltage supplied to the transmission power circuit to decrease as the determined transmission power level decreases.

25. A method as recited in claim 24, wherein said managing (c) of the power dissipation causes the bias control signal supplied to the transmission power circuit to decrease a bias level for the amplifiers as the determined transmission power level decreases.

26. A method as recited in claim 22, wherein said managing (c) of the power dissipation causes the bias control signal supplied to the transmission power circuit to decrease a bias level for the amplifiers as the determined transmission power level decreases.

27. A method for managing power of a transmitter, comprising the acts of:

(a) receiving analog data signals to be transmitted over a link;

(b) determining a suitable supply voltage, a suitable bias current, and a suitable drive current based on transmission conditions;

(c) amplifying the analog data signals in accordance with the suitable supply voltage, the suitable bias current, and the suitable drive current; and (d) coupling the amplified analog data signal to the link.

28. A method as recited in claim 27, wherein said method operates the transmitter to adaptively adjust power consumption of the transmitter by said determining (b) of the suitable supply voltage, the suitable bias current, and the suitable drive current.

\* \* \* \* \*